United States Patent [19]

Nakanose

[11] 3,962,508
[45] June 8, 1976

[54] THERMOPLASTIC RESIN TAPE FOR PACKAGING
[76] Inventor: Tokumitsu Nakanose, 1-17, Ikoma-cho, Kita, Nagoya, Aichi, Japan
[22] Filed: Mar. 26, 1975
[21] Appl. No.: 562,230

[52] U.S. Cl. .............................. 428/169; 24/16 PB
[51] Int. Cl.² ....................................... B65D 63/10
[58] Field of Search ................ 428/156, 910, 169; 24/16 PB; 206/411; 264/210 R, 243

[56] References Cited
UNITED STATES PATENTS

| | | |
|---|---|---|
| 3,506,528 | 4/1970 | Dean .................................. 428/156 |
| 3,575,764 | 4/1971 | McFarmer .......................... 428/156 |
| 3,746,608 | 7/1973 | Takahashi ........................... 428/169 |
| 3,832,267 | 8/1974 | Liu ...................................... 264/293 |

Primary Examiner—Marion E. McCamish
Assistant Examiner—Stanley Silverman
Attorney, Agent, or Firm—Johnson, Dienner, Emrich & Wagner

[57] ABSTRACT

A thermoplastic resin tape for packaging which has embossed areas on its surface and other areas which are not embossed. The non-embossed portions of the tape are located at intervals on the embossed surface so that the non-embossed portions are aligned in spaced relation to one another lengthwise of the tape and are surrounded by the embossed portions.

4 Claims, 7 Drawing Figures

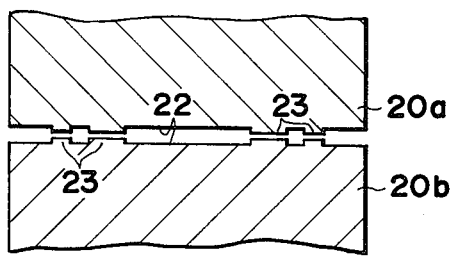
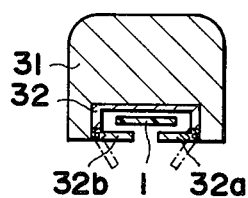
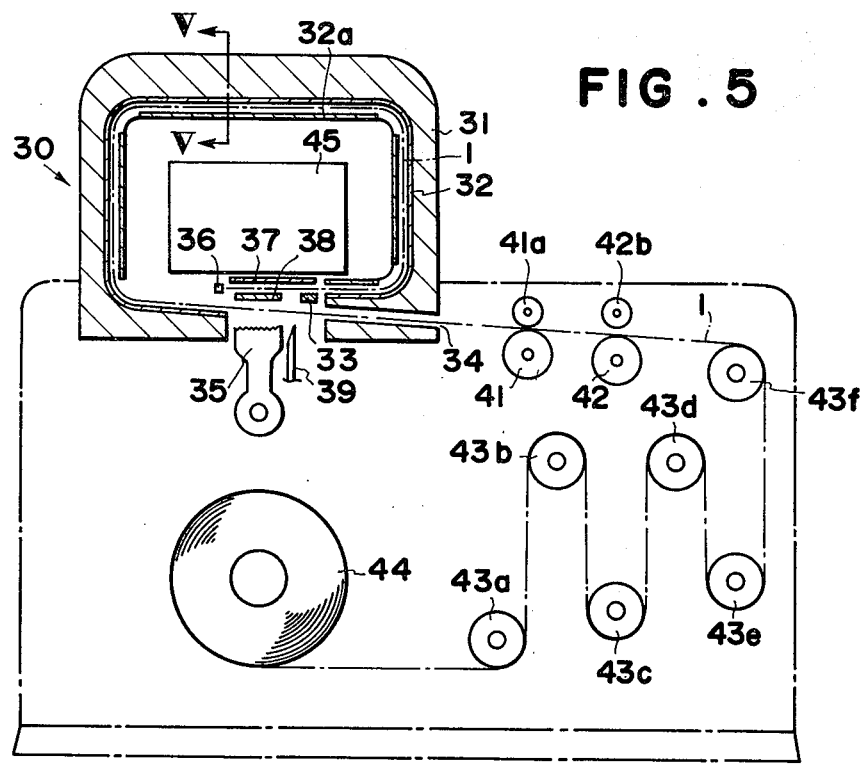
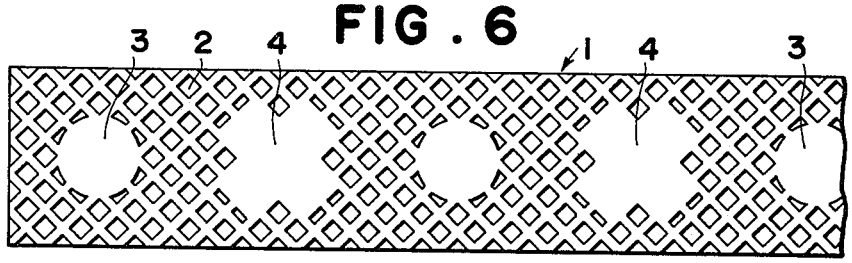

3,962,508

THERMOPLASTIC RESIN TAPE FOR PACKAGING

BACKGROUND OF THE INVENTION

The present invention relates to a tape or band for wrapping around packages wherein the tape is made of a thermoplastic resin, and is usually operated upon for packaging by a packaging machine, which will be described later.

Conventionally, packaging tapes made of thermoplastic resin materials such as polyethylene, polystyrene, etc. have been widely used, which generally has a thickness of 1.0 mm and width of 15 mm. However, it has been found that the conventional packaging tape often produced objectionable cracks or splits in the longitudinal direction of the tape.

In order to overcome such objections, numerous attempts have been made. Some are improvements in a tape and others in a packaging machine.

With respect to the improvements in the tape, an improved tape has been suggested which is embossed entirely on either or both surfaces of the tape to prevent the resin tape from cracking or splitting in the lengthwise direction thereof. One technical doctrine of embossing the tape is based upon the fact that the embossment effectively disorders the arrangement of micelle particles within the thermoplastic resin materials, which has succeeded in preventing the disadvantages of cracking or splitting in the lengthwise direction of the tape.

While the objectionable splitting has been overcome, however, another shortcoming has appeared in that the rigidity of the tape is unsatisfactorily low, resulting in that the tape cannot be delivered to or fed through the packaging machine in a packaging operation. Further, I have found another shortcoming in that a strain or flection is produced on both sides of the tape, and therefore the tape does not lie straight, but is abnormally bent and/or waved. This is, I believe, due to the fact that when embossments are formed on the tape, pressure applied on the tape for forming the embossments is not uniform on every part of the tape. Therefore, an excessive pressure on one side or a part of the tape causes the strain to be produced in the tape. When such a strain or flection is produced on the tape, the tape cannot be delivered in a smooth manner through the packaging machine, and the tape does not closely contact or adhere to an article, such as corrugated cardboard boxes to be packed.

Accordingly, an object of the present invention is to provide a novel thermoplastic resin packaging tape which meets with the various requirements for a smooth packaging operation.

Another object of the present invention is to provide a thermoplastic resin packaging tape which can closely contact and adhere to an article to be packed, without producing waves on the sides of the tape.

Other objects and features of the present invention will become apparent from the detailed description of the preferred embodiment thereof, which will be read with reference to the accompanying drawings.

DESCRIPTION OF THE DRAWINGS

FIG. 4 is a fragmentary vertical sectional view through, and showing a part of, the embossing rollers shown in FIG. 3;

FIG. 5 is a schematic side view of a known packing machine, showing a packaging operation.

FIG. 5a is a vertical sectional view taken substantially along the plane of line V—V in FIG. 5; and FIG. 6 is a plan view of a thermoplastic resin packaging tape according to another embodiment of the present invention.

DETAILED DESCRIPTION OF THE INVENTION

Figure 1:
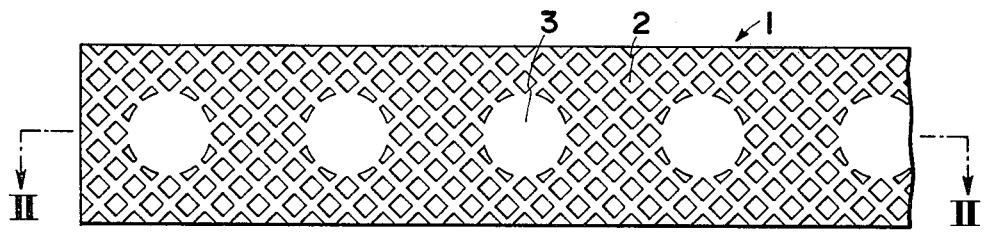
FIG. 1 is a plan view of a thermoplastic resin packaging tape embodying the present invention.
Figure 2:
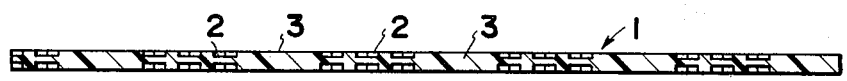
FIG. 2 is a longitudinal sectional view of the thermoplastic resin packaging tape embodying the invention and taken along line II—II of FIG. 1.

In FIGS. 1 and 2, which show an embodiment of the present invention, a thermoplastic synthetic resin tape 1 is provided with a number of small indentations on the top and bottom surfaces thereof so that the tape has concavo-convex portions, which will be identified hereinafter as embossed portions 2. The tape 1 is further provided on both surfaces thereof with a number of circular non concavo-convex portions, which will be identified hereinafter as non-embossed portions 3. The non-embossed portions 3 occupy a relatively wide area on the tape 1 and are disposed at regular intervals on the central part of tape so that the non-embossed portions are aligned with one another and surrounded by the embossed portions as clearly shown in FIG. 1. It is preferable that the total area occupied by the non-embossed portions 3 lies within the range of from 10% to 50% of the entire surface area of the tape 1. If the non-embossed portions 3 fall outside of the above-described range, either the desired rigidity cannot be obtained, or defective splittings will appear in the longitudinal direction of the tape. More specifically, if the non-embossed portions occupy an area less than about 10% of the whole tape area, a favorable rigidity in the tape cannot be expected and a strain or flection will be produced on both sides of the tape; and if the non-embossed portions are more than about 50% of the entire surface area of the tape, prevention of cracking or splitting cannot be achieved due to the micelle particle arrangement in the thermoplastic synthetic resin material. Thus, it is important to have the non-embossed portions formed within the above-described range.

Figure 3:
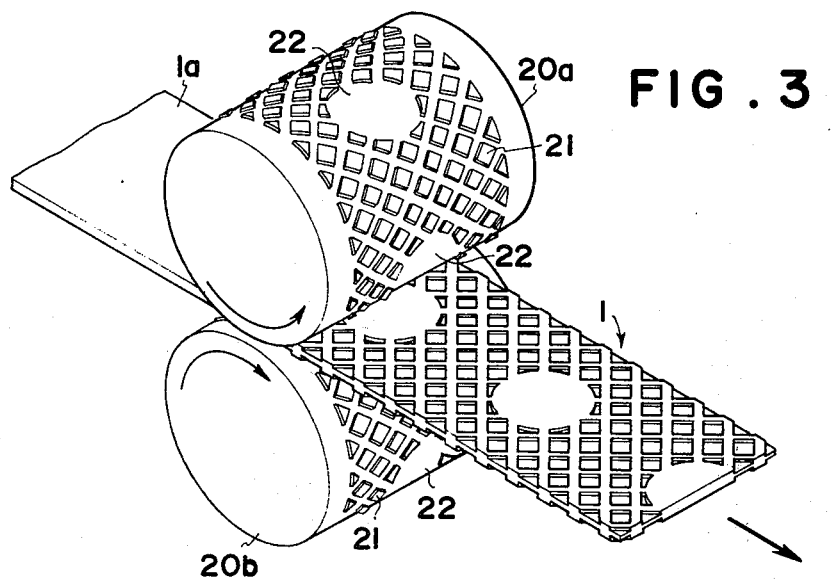
FIG. 3 is a perspective view of the thermoplastic resin packaging tape and embossing rollers, showing the process of forming embossed and non-embossed portions on the tape.

In FIGS. 3 and 4 showing a formation of the embossed and non-embossed portions on the tape, a thermoplastic resin base tape 1a having a predetermined thickness and width is fed into the nip of a pair of embossing rollers 20a and 20b and pressed by the rollers. Both rollers 20a and 20b have a number of small studs on the surface thereof which form a concavo-convex area 21 on the rolling surface of the rollers. The rollers are further provided with relatively large non-embossing portions 22 on the rolling surfaces thereof so that the non-embossed portions are surrounded with the concavo-convex area 21. The total of the area of the non-embossed portions on the rollers should be within the range of 10–50% of the entire effective rolling surface of the rollers so as to form, on the tape, the non-embossed portions 3 which lie within the range 10–50% of entire surface of the tape as described before. The non-embossed portions 22 formed on the rollers 20a and 20b are of a circular shape and disposed at regular intervals on the rolling surfaces of the rollers, so that the non-embossed area 22 on each of the rollers are aligned with one another on the central portion of the rolling surface. The studs 23 each has a thickness which is at least as great as the thickness of the tape. The embossment rollers 20a and 20b are assembled in a known way such that the non-embossed portion of the roller 20a will be brought into alignment, and coincide with the non-embossed portion of the other roller 20b when the both rollers 20a and 20b are rotated so as to form the embossed and non-embossed portions on the base tape 1a.

When both of the rollers 20a and 20b are rotated in opposite directions as illustrated by arrows in FIG. 3, by a known driving mechanism (not shown), the thermoplastic synthetic resin base tape 1a is fed into and pressed by the rollers 20a and 20b to continuously form the embossed portions 2 and non-embossed portions 3, and is continuously delivered at a speed of 70m/min. in the direction shown by the straight arrow of FIG. 3. The pressure applied to the tape 1 by the two rollers 20a and 20b is about 3 kg.m$^2$. Thus, the tape 1 of the invention is produced by rotating the rollers 20a and 20b which have embossed areas 21 and non-embossed portions 22 at regular intervals.

In the packaging tape thus produced as described above, the non-embossed portions 3 are formed on the tape at regular intervals on the central area of the tape so that the non-embossed portions 3 are surrounded by the embossed portions 2. The rollers 20a and 20b play a role not only to form the embossed and non-embossed portions but also to rearrange effectively the micelle particles to a more disorderly arrangement in the synthetic resin material of the tape 1 so as to prevent splitting in the longitudinal direction of the tape.

A packaging operation will be described with reference to FIGS. 5 and 5a, the latter being a sectional view taken along V—V in FIG. 5, showing a general type of a packaging machine known per se. First the construction of the packaging machine will be explained. The packaging machine 30 has an arch-shaped fixed frame 31, a holding member 33, which is movable up and down, a clamping member 35, a limit switch 36, a movable metal plate 37, a heated plate 38 which is movable in the lateral direction, a cutter 39, a delivery roller 41, a rewinding roller 42, and a reel 44 on which the tape is wound. The limit switch 36 is electrically connected (not illustrated) to the delivery roller 41 and to the rewinding roller 42. Each of the rollers 41 and 42 has its own idler roller 41a and 42a respectively, which are disposed adjacent to an inlet 34 of the machine, the inlet 34 being in communication with a guide member which will be described with reference to FIG. 5a. As shown in FIG. 5a, the packaging machine further comprises, on the inner side of the arch-shaped fixed frame 31, a guide member 32 which has ledges 32a and 32b projecting in opposite directions toward each other. The guide member 32 is made of metal and is so formed that the ledges 32a and 32b are pivotable, as shown by the phantom lines in FIG. 5a, so that the tape 1 which is delivered within the guide member 32 can be forcibly removed from the guide member. The guide member may be of any shape or configuration provided that it can be removed therefrom by a pulling operation of the tape, the operation being described hereinafter.

With respect to a packaging operation, an article 45 to be packed is placed in position as shown in FIG. 5. The tape 1 is delivered within the guide member 32 from the reel 44 around the rollers 43a through 43f and the inlet, by driving the delivery roller 41. The guide member 32 is disposed on the inside surface of the fixed frame 31. When the leading end of the tape 1 is delivered through the guide member 32 to come to the predetermined position below the movable metal plate 37, the limit switch 36 is actuated to stop the rotation of the delivery roller 41, and to lift up the holding member 33 at the same time so as to firmly press or push the tape onto the movable metal plate 37 at the place adjacent to the leading end of the tape. Thus, the leading end portion of the tape is locked or grasped by the two members 33 and 37. After the leading end portion of the tape is locked, the delivery roller 41 and the free roller 41a are released and the rewinding roller 42 is driven so as to reverse the direction of the tape. When the tape is pulled by the reversing operation of the rewinding roller while the leading end portion of the tape is still locked, the tape is forcibly removed from the guide member 32. In this instance, the ledges 32a and 32b of the guide member are forcibly pivoted by the tape which has been pulled by the rewinding roller 42 as described above. The pivotal movement of the ledges are shown by the phantom lines in FIG. 5a. Continued operation of the rewinding roller 42 forces the tape 1 to come into contact with the article 45 so that the tape is wound tight around the article 45.

After the tape is wound tight around the article by the operation of the rewinding roller 42, the heat plate 38, which is heated by a heating device (not illustrated) is inserted below the leading end portion of the tape so that the heated plate 38 slightly touches the lower surface of the leading end portion and is positioned between and adjacent to the two layers of the tape. Immediately after the heated plate is inserted in position, the clamping member 35 is lifted a little bit so that the other layer of the tape is slightly touched with the lower surface of the heat plate 38. At this time, the two layers of the tape are thermally molten or fused at one side of each layer. After the lower surface of the upper layer (i.e., the leading end portion) and the upper surface of the lower layer of the tape 1 are thermally molten, the clamping member 35 is lowered and the heated plate 38 is then removed. Then, the clamping member 35 is lifted up again to make the thermally molten tape layers contact each other.

After the thermal welding is completed between the two layers of the tape as described above, the movable metal member 37 is removed from the path of the tape just like the heat plate 38 was, and the tape is cut with the cutter 39 so as to complete the packaging operation. The cut portion of the tape will become a new leading end of the tape for another packing operation. The driving mechanism for the rollers 41, 42, clamping member 35, heat plate 38, etc. is not disclosed since the mechanism is known per se in the art and not the subject matter of the present invention.

According to the present invention, since the embossed tape has non-embossed portions at regular intervals on the central part of the tape, flection or strain which has been produced in the conventional resin tapes can be completely removed because the pressure, particularly an excessive pressure, applied to the tape for the purpose of forming the embossed portion can be effectively lost toward the non-embossed portions. Further, a favorable rigidity can be obtained by forming the non-embossed portions at regular intervals. Therefore, the tape can be delivered in the packaging machine in a smooth manner and desirably fixed to a packaging article such as corrugated cardboard box without any undulations or waves on the sides of the tape.

Although the present invention has been described with reference to the preferred embodiment thereof, many modifications and alterations may be made within the spirit of the present invention. For example, the non-embossed portions may be a combination of circular shape and cross shape 4 as illustrated in FIG. 6.

What is claimed is:

1. A thermoplastic resin tape for packaging, said tape having a non-uniform thickness consisting of concave-convex portions except for areas of uniform thickness disposed in spaced relation along the length of said tape at substantially regular intervals on the central part thereof.

2. A thermoplastic resin tape for packaging as claimed in claim 1, wherein said areas of uniform thickness occupy 10–50% of the entire surface area of said tape.

3. A thermoplastic resin tape for packaging as claimed in claim 1, wherein each of said areas of uniform thickness is substantially circular.

4. A thermoplastic resin tape for packaging as claimed in claim 1 wherein some of said areas of uniform thickness are circular and others have cross shapes.

* * * * *